(12) United States Patent
Gaillard et al.

(10) Patent No.: US 7,695,531 B2
(45) Date of Patent: Apr. 13, 2010

(54) METHOD FOR PRODUCING A LITHIUM MICROBATTERY

(75) Inventors: Frederic Gaillard, Voiron (FR); Marc Plissonnier, Eybens (FR); Raphael Salot, Lans en Vercors (FR); Stephanie Roche, Grenoble (FR)

(73) Assignee: Commissariat A'Lenergie Atomique, Paris (FR)

( * ) Notice: Subject to any disclaimer, the term of this patent is extended or adjusted under 35 U.S.C. 154(b) by 1028 days.

(21) Appl. No.: 10/576,511

(22) PCT Filed: Nov. 4, 2004

(86) PCT No.: PCT/FR2004/002842

§ 371 (c)(1),
(2), (4) Date: Apr. 20, 2006

(87) PCT Pub. No.: WO2005/050756

PCT Pub. Date: Jun. 2, 2005

(65) Prior Publication Data

US 2007/0067984 A1   Mar. 29, 2007

(30) Foreign Application Priority Data

Nov. 14, 2003   (FR) .................................. 03 13325

(51) Int. Cl.
*H01M 10/04* (2006.01)

(52) U.S. Cl. .................... 29/623.5; 29/623.1; 29/623.2; 429/162

(58) Field of Classification Search .................. None
See application file for complete search history.

(56) References Cited

U.S. PATENT DOCUMENTS

| 5,561,004 | A | 10/1996 | Bates et al. |
| 6,280,875 | B1 | 8/2001 | Kwak et al. |
| 2003/0118897 | A1 | 6/2003 | Mino et al. |
| 2003/0175585 | A1 | 9/2003 | Ugaji et al. |

FOREIGN PATENT DOCUMENTS

| WO | WO 00/60689 A1 | 10/2000 |
| WO | WO 02/47187 A1 | 6/2002 |

OTHER PUBLICATIONS

Bates et al.; "Thin Film Rechargeable Lithium Batteries for Implantable Devices;" *ASAIO Journal*; vol. 43, No. 5; Sep. 1, 1997; pp. 644-647.

*Primary Examiner*—Jonathan Crepeau
*Assistant Examiner*—Tony Chuo
(74) *Attorney, Agent, or Firm*—Oliff & Berridge, PLC

(57) ABSTRACT

During the production of a lithium microbattery, the electrolyte containing a lithiated compound is formed by successively depositing an electrolytic thin film, a first protective thin film that is chemically inert in relation to the lithium, and a first masking thin film on a substrate provided with current collectors and a cathode. A photolithography step is carried out on the first masking thin film in order to create a mask for selectively etching the first masking thin layer, and the first protective thin layer and the electrolytic thin film are then selectively etched in such a way as to form the electrolyte in the electrolytic thin film. This technique enables the electrolyte to be formed by photolithography and etching without causing any damage thereto.

12 Claims, 5 Drawing Sheets

METHOD FOR PRODUCING A LITHIUM MICROBATTERY

BACKGROUND OF THE INVENTION

The invention relates to a method for producing a lithium microbattery successively comprising formation, on a substrate, of first and second current collectors, of a cathode, of an electrolyte comprising a lithiated compound and of an anode comprising lithium.

STATE OF THE ART

At present, most lithium microbatteries are produced by deposition of thin layers through masks designed to define the final form of the different elements constituting the microbattery. Thus, in a microbattery, the current collectors, the cathode and the electrolyte are generally achieved by Physical Vapor Deposition (PVD) on a substrate. The current collectors are for example made of platinum whereas the cathode can be made of titanium disulphide ($TiS_2$), titanium oxysulphide ($TiO_xS_y$), or vanadium oxide ($V_xO_y$). The electrolyte comprises a lithiated compound such as a lithium and phosphorus oxynitride (LiPON) and the anode is defined by deposition of metallic lithium achieved by evaporation through a mask.

This masking technique is very well suited for dimensions of a centimeter or more. However, the masking technique induces a particle contamination and the mask used may scratch the layer on which it is deposited, thus being liable to damage the microbattery greatly. Finally, when the components of a microbattery are of small size, the mask may prove detrimental, in particular on account of the edge effects that can occur. In addition, current microbatteries are developed to be incorporated in microcomponents using any type of microelectronics technology. The techniques for producing the microbatteries therefore have to be compatible with conventionally used microelectronics technologies.

Likewise, with the current deposition technology through a mask, the microbattery being produced can neither be placed in the air nor can it be moved between two deposition steps, as water, air and humidity are harmful to the lithiated compounds or the lithium contained in the microbattery. Thus, implementation of the production method still proves difficult to industrialize, is very expensive and is not compatible with the technologies implemented in the microelectronics field.

Once the lithium microbattery has been fabricated, the lithiated compound anode being exposed, it is also known to deposit a protective envelope on the whole of the microbattery to protect the anode against the outside environment. The protective envelope is for example formed by metal layers and a layer of parylene®. Thus, during production and up to the final encapsulation step, the microbattery remains in a neutral atmosphere, for example in argon.

To remedy the problem of the sensitivity of the anode to air, the document WO-A1-0060689 describes a method for producing a lithium battery in which the metallic lithium anode consists of an electrochemical plating between the anodic current collector and a covering layer, during initial charging of the battery. Thus, before its initial charging, the battery does not comprise any anodic material and can undergo thermal treatment at a temperature of 250° C. in air for 10 minutes, without the charging and discharging capacity being impaired.

OBJECT OF THE INVENTION

The object of the invention is to produce a lithium microbattery that is easy to implement, inexpensive and compatible with the technologies implemented in the microelectronics field, and in particular to incorporate one such microbattery on a microcomponent such as an integrated circuit.

According to the invention, this object is achieved by the fact that the electrolyte formation step comprises at least the following successive operations:

- deposition of an electrolytic thin layer on the substrate provided with the current collectors and with the cathode,
- deposition, on the electrolytic thin layer, of a first protective thin layer that is chemically inert with regard to lithium, and then of a first masking thin layer,
- fabrication of a mask by photolithography on the first masking thin layer,
- selective etching of the first masking thin layer then removal of the mask,
- selective etching of the first protective thin layer and of the electrolytic thin layer so as to form the electrolyte in the electrolytic thin layer, and removal of the first protective thin layer and the first masking thin layer.

According to a development of the invention, the first protective thin layer consists of a first material chosen from a hydrogenated amorphous silicon carbide, a hydrogenated amorphous silicon oxycarbide, a hydrogenated amorphous silicon carbonitride, hydrogenated amorphous carbon, fluorinated and hydrogenated amorphous carbon, and a fluorinated and hydrogenated amorphous carbon nitride.

According to another development of the invention, the first masking thin layer consists of a second material distinct from the first material and chosen from a hydrogenated amorphous silicon carbide, a hydrogenated amorphous silicon oxycarbide, a hydrogenated amorphous silicon carbonitride, a silicon nitride and a silicon oxide.

According to a preferred embodiment, formation of the anode comprises at least the following steps:

- deposition of an anodic thin layer on the substrate provided with the current collectors, the cathode and the electrolyte,
- deposition of a third protective thin layer and then of a second masking thin layer on the anodic thin layer,
- fabrication of a mask by photolithography on the second masking thin layer,
- selective etching of the second masking thin layer then removal of the mask,
- selective etching of the third protective thin layer and of the anodic thin layer so as to form the anode in the anodic thin layer and removal of the protective and masking thin layers.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS.

Figure 5:
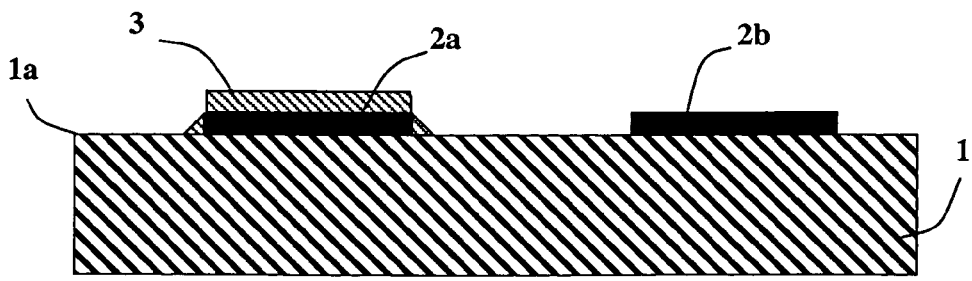

As illustrated in FIG. 5, the first steps of production of a lithium microbattery consist in forming first and second current collectors 2a and 2b and a cathode 3 on a surface 1a of a substrate 1. The first steps of production of the lithium microbattery can be performed by any type of known method.

Figure 1:
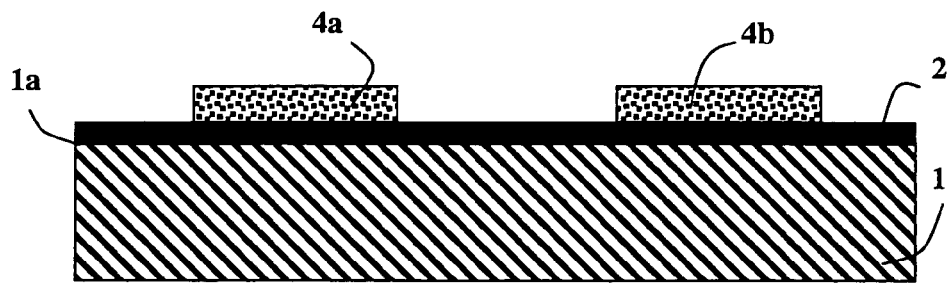
FIGS. 1 to 5 represent, in cross-section, successive steps of fabrication of current collectors and of a cathode on a substrate, according to the prior art.
Figure 2:
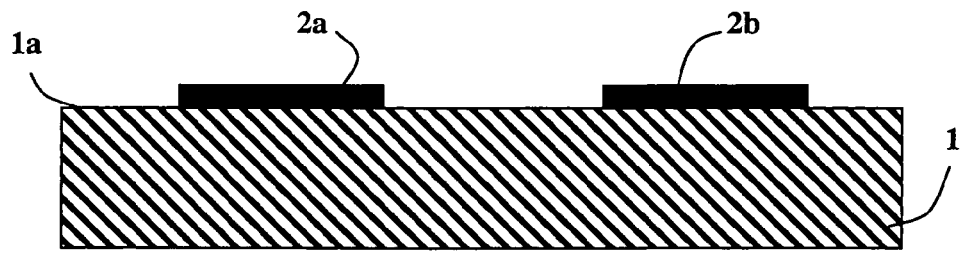

Preferably and as represented in FIGS. 1 and 2, to form the first and second current collectors 2a and 2b, a thin layer 2, for example of platinum, titanium or gold and having a thickness of 200 nm, is deposited on the whole of the substrate 1 by Physical Vapor Deposition (PVD) or by Chemical Vapor Deposition (CVD). The substrate 1 can for example be a silicon wafer or a silicon wafer containing an Application Specific Integrated Circuit (ASIC). The thin layer 2 is then covered by a thin layer of photoresist that is photolithographed so as to form first and second masking elements 4a and 4b (FIG. 1). The first and second masking elements 4a and 4b respectively determine the shape and position of the first and second current collectors 2a and 2b on the surface 1a of the substrate 1 by plasma etching (FIG. 2). Plasma etching is for example performed with a mixture of argon, nitrogen and carbon tetrafluoride ($CF_4$).

Figure 3:
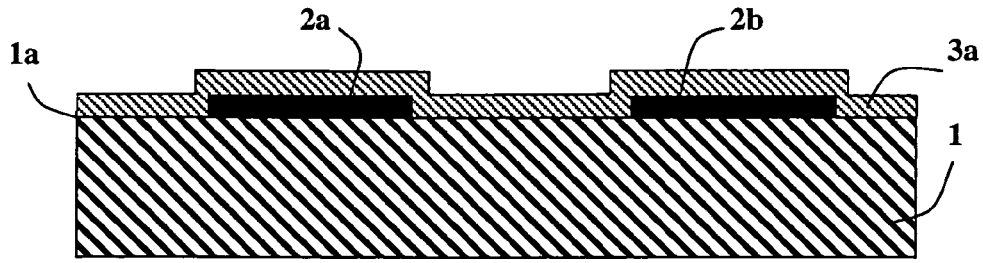
Figure 4:
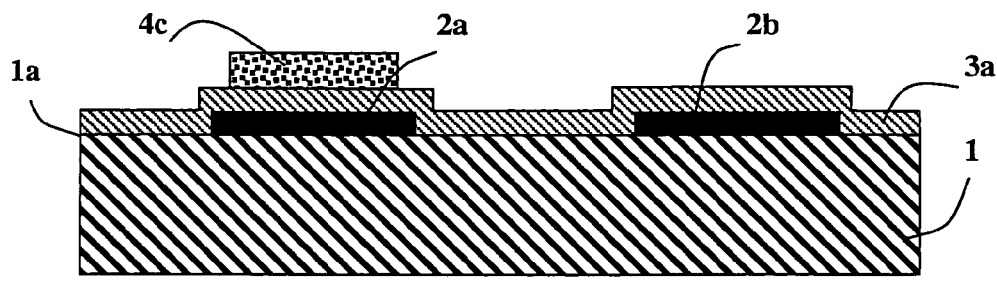

The cathode 3 is then formed on the first current collector 2a by depositing a cathodic thin layer 3a of about 1.5 μm on the whole of the surface 1a of the substrate 1 provided with the first and second current collectors 2a and 2b (FIG. 3) by PVD or CVD. A thin layer of photoresist is then deposited on the whole of the cathodic thin layer 3a and is then photolithographed to form a third masking element 4c (FIG. 4). The third masking element 4c arranged above the first current collector 2a determines the shape and position of the cathode 3 when a plasma etching step is performed (FIG. 5). The cathode 3 totally covering the first current collector 2a consists of any type of material known for this purpose and, for example, it can be made of titanium disulphide ($TiS_2$), vanadium pentoxide ($V_2O_5$) or titanium oxysulphide also called "TiOS" or $TiO_xS_y$.

At the present time, the elements constituting the lithium microbattery containing lithiated compounds that are very sensitive to oxygen, nitrogen and water can not be formed with the techniques implemented to produce the current collectors 2a and 2b and the cathode 3 and in particular by photolithography and by etching. Indeed, certain steps such as removal of the photoresist masking elements and movement of the substrate 1 between two production steps of the constitutive element can cause particle contamination and/or damage to the lithiated compounds. Before performing photolithography and plasma etching, a protective thin layer could be deposited on the thin layer comprising the lithiated compound. Such a protective thin layer would however not be sufficient to prevent damage of the thin layer of lithiated compound, in particular when the masking elements are removed.

To overcome this drawback, the invention uses a double masking formed by two distinct superposed thin layers both enabling microelectronics technologies to be used, in particular photolithography and plasma etching, and preventing any damage to the lithiated compound layers. The double masking consists of materials that are inert with regard to lithium and enable etching of the thin lithiated compound layer.

Figure 6:
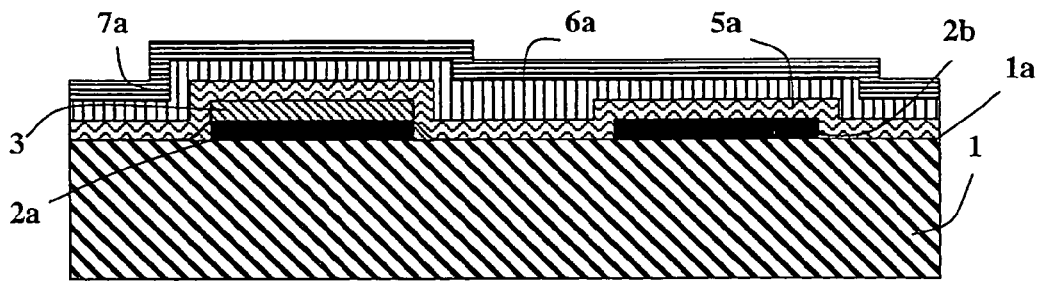
FIGS. 6 to 9 represent, in cross-section, different steps of formation of an electrolyte according to the invention.
Figure 7:
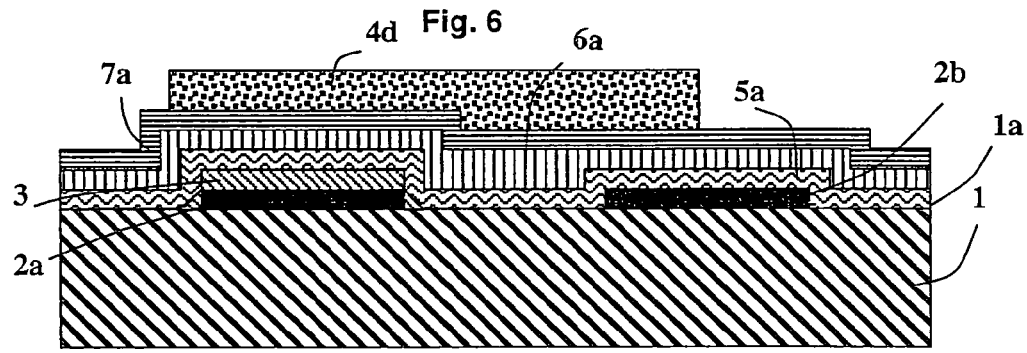
Figure 8:
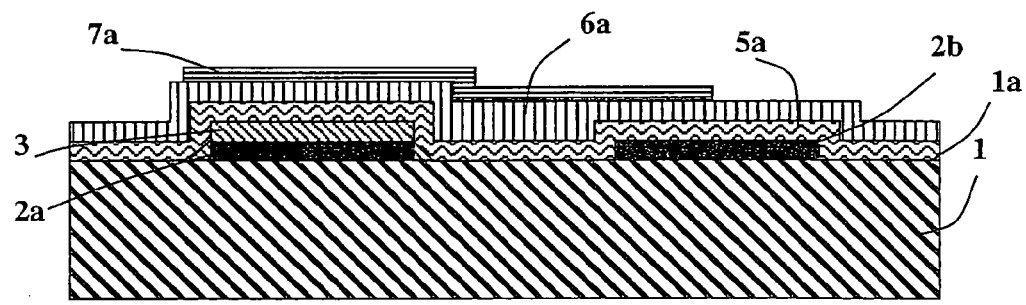
Figure 9:
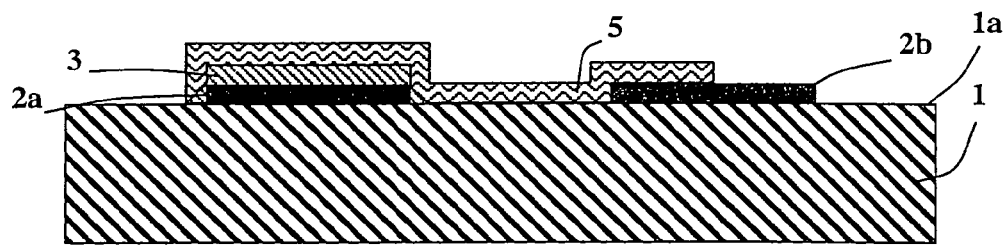

Thus, as illustrated in FIGS. 6 to 9, the electrolyte 5 comprising at least one lithiated compound, for example a lithium and phosphorus oxynitride (LiPON), is formed on the surface 1a of the substrate 1 provided with the first and second current collectors 2a and 2b and with the cathode 3. The electrolyte 5 covers the whole of the cathode 3, a part of the surface 1a of the substrate 1 arranged between the first and second current collectors 2a and 2b and a part of the second current collector 2b (FIG. 9). As represented in FIG. 6, to form the electrolyte 5 and in particular to define the shape and position thereof, an electrolytic thin layer 5a comprising at least one lithiated compound and having a thickness of about 1 mm is deposited on the whole of the surface 1a of the substrate 1 provided with the current collectors 2a and 2b and with the cathode 3. Deposition of the electrolytic thin layer 5a is for example achieved by physical vapor deposition. To protect the lithiated compound contained in the electrolytic thin layer 5a, a first protective thin layer 6a constituted by a material that is chemically inert with regard to lithium and a first masking thin layer 7a are successively deposited on the whole of the electrolytic thin layer 5a, thus forming a stack called double masking. The double masking is for example achieved by Plasma Enhanced Chemical Vapor Deposition (PECVD).

The first protective layer 6a and the first masking layer 7a preferably respectively consist of distinct first and second materials able to be chosen from a hydrogenated amorphous silicon carbide ($SiC_xH_y$, also noted $SiC_x$:H, with $0<x\leq1$), a hydrogenated amorphous silicon oxycarbide ($SiO_xC_yH_z$, also noted $SiO_xC_y$:H, with $0<x\leq2$ and $0<y\leq1$) and a hydrogenated amorphous silicon carbonitride ($SiC_xN_yH_z$, also noted $SiC_xN_y$:H, with $0<x\leq1$ and $0<y\leq1.33$).

The first material of the first protective layer 6a can also be chosen from hydrogenated amorphous carbon ($CH_x$ or C:H), fluorinated and hydrogenated amorphous carbon also noted $CF_xH_y$ or $CF_x$:H or a fluorinated and hydrogenated amorphous carbonitride ($CN_xF_yY_z$ also noted $CN_xF_y$:H). The second material of the first masking layer 7a can also be chosen from a silicon nitride (SiN) or a silicon oxide such as $SiO_2$. Hydrogenated amorphous carbon ($CH_x$ or C:H) and/or hydrogenated amorphous silicon ($SiH_x$ or Si:H) could also be used as inert materials with regard to lithium for the basic materials of lithium do not react with silicon or carbon. However, the latter two materials are not sufficiently impermeable to ensure the tightness of the lithiated material layer on their own.

The first protective layer 6a covers the electrolytic thin layer 5a totally so as to form a tight encapsulation of said electrolytic thin layer 5a whereas the first masking thin layer 7a enables a step of photolithography followed by etching of the electrolytic layer 5a to be performed without damaging the latter.

Thus, as represented in FIG. 7, the photolithography step consists in depositing a thin layer of photoresist on the whole of the masking thin layer 7a and in then exposing it through a mask so as to obtain a fourth masking element 4d made from photoresist, once the exposed parts have been eliminated (in the case of a positive photoresist). The fourth masking element 4d covering a part of the first masking layer is arranged above the whole of the cathode 3, the part of the surface 1a of the substrate comprised between the first and second current collectors 2a and 2b and a part of the second current collector 2b.

The first masking layer 7a being directly in contact with the photoresist masking element during the photolithography step and with the etching plasma, it presents different etching characteristics from those of the first protective layer and the thickness thereof is preferably about a few hundred nanometers. The first masking layer 7a also presents a good adhesion to the first protective layer 6a and it can also act as anti-reflective layer for the photolithography step, by eliminating the stray light rays that could appreciably modify the shape of the masking element.

The first protective layer 6a and first masking layer 7a and also the electrolytic thin layer 5a have a different behavior with regard to plasma etching. Selective etchings can thus be performed so that the electrolytic layer 5a is not damaged when the fourth photoresist masking element 4d is eliminated. The masking element is in fact generally eliminated by means of a solvent that is liable to damage the lithiated compound of the electrolytic layer if the latter was not protected by the double masking. The double masking technique thus enables the lithiated material never to be in contact with the environment, in particular due to selectivity of the successive etchings.

Thus, as represented in FIG. 8, the first masking layer 7a is etched, preferably by plasma, the fourth masking element 4d defining the shape and position of the remaining first masking layer. Only the free part of the masking layer 7a, i.e. the part not covered by the fourth masking element 4c, is in fact removed by etching. Then the fourth masking element 4d is removed by any type of known means in particular by means of a solvent.

As illustrated in FIGS. 8 and 9, the electrolyte 5 is formed, in the electrolytic thin layer 5a, by selective etching, preferably by plasma, of the first protective layer 6a and of the electrolytic thin layer 5a. Only the parts of the first protective layer and of the electrolytic thin layer that are not covered by the first masking layer 7a are removed by etching. Thus, the shape and position of the electrolyte 5 is determined by the shape and position of the first masking layer 7a, once the latter has been etched. The first protective layer 6a and the first masking layer 7a are then removed.

Figure 10:
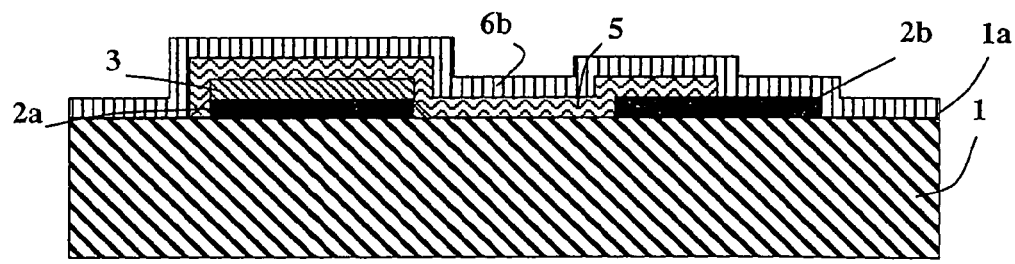
FIG. 10 represents, in cross-section, an encapsulation step of the electrolyte formed according to FIGS. 6 to 9.

To form the anode, it may be necessary to move the lithium microbattery during production and therefore to place it in air, which would be liable to damage the electrolyte 5 comprising a lithiated component. In this case, a second protective layer 6b is deposited on the whole of the surface 1a of the substrate 1 provided with the current collectors 2a and 2b, the cathode 3 and the electrolyte 5, so as to totally cover the electrolyte 5 in tight manner (FIG. 10). For example, the second protective layer 6b can be formed by the same material as the first protective layer 6a and can be deposited by PECVD. The second protective layer 6b will be removed, once the lithium microbattery is returned to a neutral environment.

Figure 11:
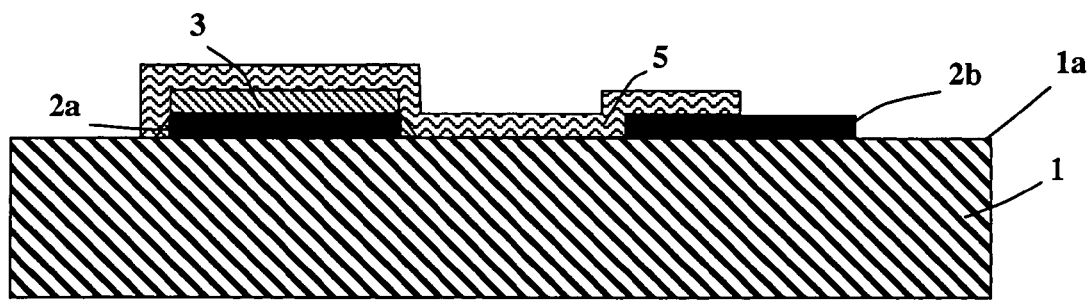
FIGS. 11 to 14 represent, in cross-section, different steps of formation of an anode according to the invention.
Figure 12:
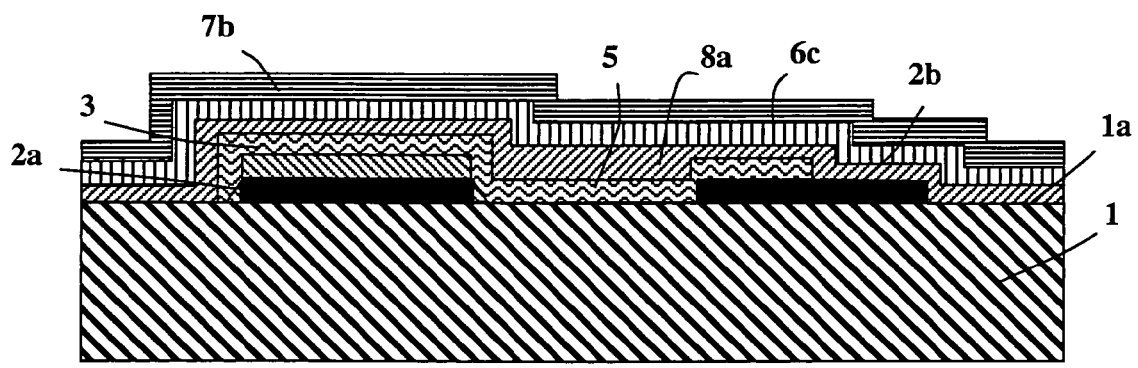
Figure 13:
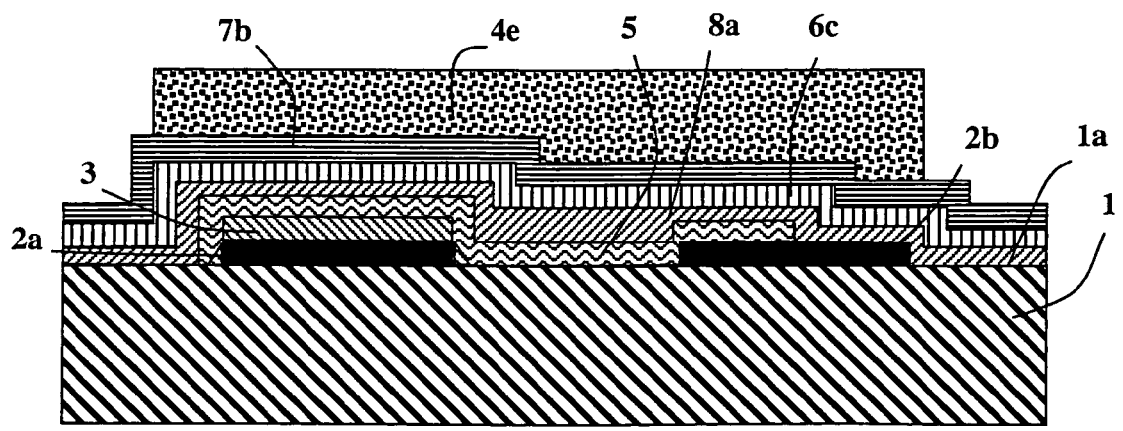

The anode, in most cases formed by metallic lithium, can also be formed by the technologies used in the microelectronics field, also using a double masking like that used to form the electrolyte 5. Thus, as represented in FIG. 11, the second protective layer 6b is removed to free the electrolyte 5, the free surface 1a of the substrate 1 and the free part of the second collector 2b. An anodic thin layer 8a, preferably made of metallic lithium, is then deposited homogeneously on the whole of the surface 1a of the substrate 1 so that the anodic thin layer 8a covers the free surface of the substrate 1, the electrolyte 5 and the free part of the second collector 2b (FIG. 12). A third protective thin layer 6c and a second masking thin layer 7b are then successively deposited on the whole of the anodic thin layer 8a so as to form a double masking. The third protective thin layer 6c can be formed by the same material as the first protective thin layer whereas the second masking thin layer 7b can be formed by the same material as the first masking thin layer 7a.

Figure 14:
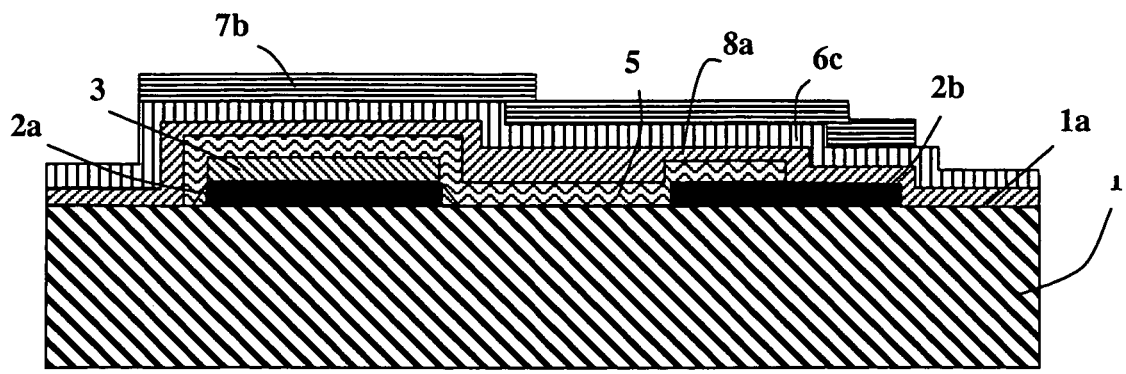
Figure 15:
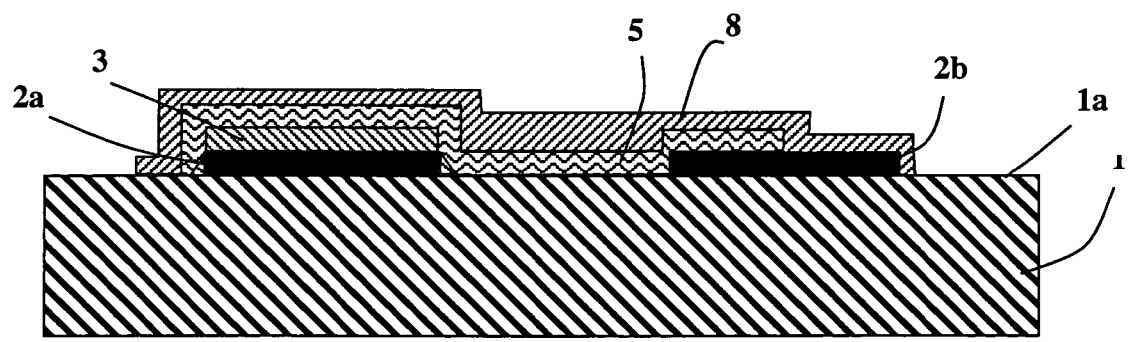
FIG. 15 represents, in cross-section, a lithium microbattery produced according to the invention.

In the same way as for formation of the electrolyte 5, a thin layer of photoresist is deposited on the second masking thin layer 7b and is then photolithographed to obtain a fifth masking element 4e designed to define the shape and position of the second masking thin layer 7a in a selective plasma etching operation of the second masking layer (FIG. 14). The third protective layer 6c and the anodic thin layer 8a are then etched selectively by plasma through the second masking layer 7b, thus defining the final shape and position of the anode 8. In FIG. 8, the anode 8 covers the electrolyte 5 and the second collector 2b totally. The third protective layer 6c and the second masking layer 7b are then removed to free the anode 8 (FIG. 15). The third protective layer 6c is preferably formed by the same material as the first protective layer 6a whereas the second masking layer 7b is preferably formed by the same material as the first masking layer 7a.

Figure 16:
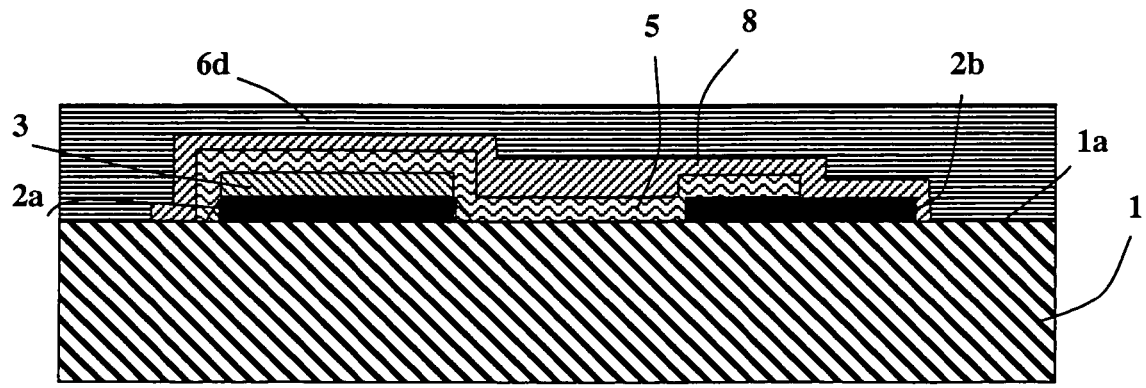
FIG. 16 represents a cross-sectional view of the lithium microbattery according to FIG. 15, provided with a protective layer.

Once the lithium microbattery has been formed, a fourth protective layer 6d can be deposited on the whole of the stack formed by the current collectors 2a and 2b, the cathode 3, the electrolyte 5 and the anode 8 (FIG. 16). The fourth protective layer 6d is preferably formed by the same material as the first protective layer. This enables tight encapsulation of the stack, and in particular of the anode, to be achieved, thus protecting it against any external contamination. The lithium microbattery can then be moved or stored in air without any risk of damaging the latter.

Figure 17:
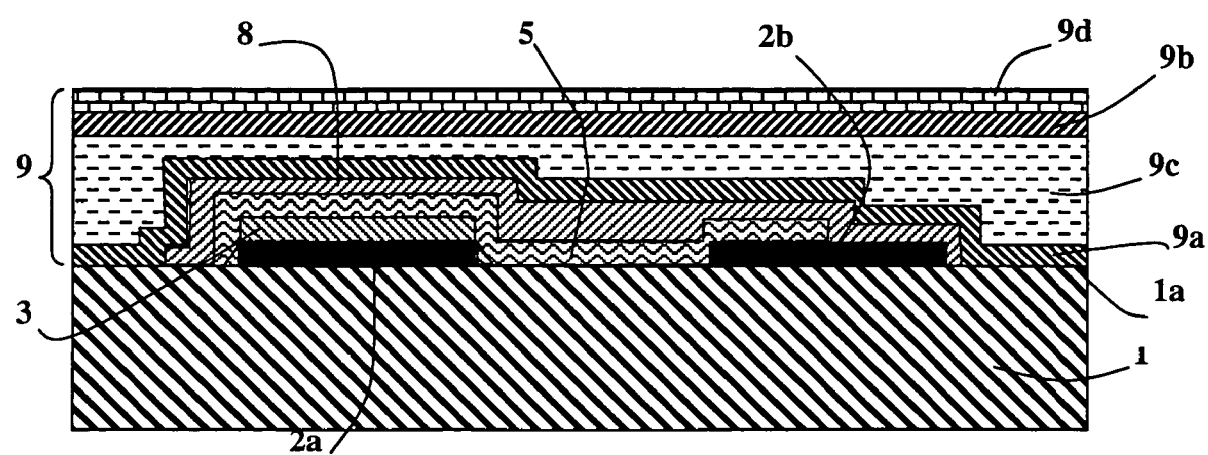
FIG. 17 represents a cross-sectional view of the lithium microbattery according to FIG. 15, provided with a protective envelope.

In an alternative embodiment illustrated in FIG. 17, the fourth protective layer can be replaced by a protective envelope 9 comprising at least first and second superposed and distinct encapsulation layers 9a and 9b. The first and second encapsulation layers 9a and 9b are successively deposited on the whole of the anode 8, by plasma enhanced chemical vapor deposition, at a deposition temperature less than or equal to 150° C. The first encapsulation layer 9a comprises at least one material that is chemically inert with regard to lithium, chosen from a hydrogenated amorphous silicon carbide, a hydrogenated amorphous silicon oxycarbide, hydrogenated amorphous carbon, fluorinated amorphous carbon and hydrogenated amorphous silicon. The second encapsulation layer 9b comprises a material chosen from a hydrogenated amorphous silicon carbonitride, a hydrogenated amorphous silicon nitride and fluorinated amorphous carbon. An intermediate layer 9c comprising a material chosen from a phosphorus-doped silicon oxide, hydrogenated amorphous carbon and fluorinated amorphous carbon can also be deposited, before deposition of the second layer encapsulation 9b, by plasma enhanced chemical vapor deposition at a deposition temperature less than or equal to 150° C. In addition, a final layer 9c, made of hydrogenated amorphous carbon or fluorinated amorphous carbon can also be deposited on the second encapsulation layer 9b by plasma enhanced chemical vapor deposition at a deposition temperature less than or equal to 150° C.

The invention is not limited to the embodiments described above. Thus, the double mask technique can be used for any constitutive element of the microbattery comprising a lithiated compound. For example, if the cathode comprises a lithiated component, it will be formed in the same way as the electrolyte 5, using a protective layer and a masking layer designed to protect it against any external contamination and to enable a photolithography and etching step to be performed. Moreover, any known type of etching can be used to form the different elements constituting the lithium microbattery. Thus, plasma etching can be replaced by dry etching.

Such a method for producing a lithium microbattery is therefore compatible with the technologies implemented, in the microelectronics field, and in particular enables such a lithium microbattery to be incorporated on a microcomponent such as an integrated circuit. Furthermore, unlike the prior art in which the constitutive elements of the microbattery are formed by deposition through a mask, being able to produce the elements constituting the microbattery by etching prevents physical contacts between a mask and the constitutive element. This reduces the risk of scratches on the constitutive element and also of possible particle contaminations, and also provides a better reproducibility, thus improving the yields on a substrate or from substrate to substrate.

Finally, being able to use the techniques implemented in the microelectronics field also enables costs to be reduced in particular for a lithium microbattery incorporated on an integrated circuit, unlike production methods according to the prior art in which the lithium microbattery had to be stuck on an integrated circuit.

The invention claimed is:

1. Method for producing a lithium microbattery successively comprising formation of first and second current collectors, of a cathode, of an electrolyte comprising a lithiated compound and of an anode comprising lithium on a substrate,
   wherein the electrolyte formation step comprises at least the following successive operations:
   deposition of an electrolytic thin layer on the substrate provided with the current collectors and with the cathode,
   deposition, on the electrolytic thin layer, of a first protective thin layer that is chemically inert with regard to lithium, and then of a first masking thin layer,
   fabrication of a mask by photolithography on the first masking thin layer,
   selective etching of the first masking thin layer then removal of the mask,
   selective etching of the first protective thin layer and of the electrolytic thin layer so as to form the electrolyte in the electrolytic thin layer, and removal of the first protective thin layer and of the first masking thin layer.

2. Method according to claim 1, wherein the first protective thin layer consists of a first material selected from the group consisting of a hydrogenated amorphous silicon carbide, a hydrogenated amorphous silicon oxycarbide, a hydrogenated amorphous silicon carbonitride, hydrogenated amorphous carbon, fluorinated and hydrogenated amorphous carbon, a fluorinated and hydrogenated amorphous carbon nitride.

3. Method according to claim 2, wherein the first masking thin layer consists of a second material distinct from the first material and selected from the group consisting of a hydrogenated amorphous silicon carbide, a hydrogenated amorphous silicon oxycarbide, a hydrogenated amorphous silicon carbonitride, a silicon nitride and a silicon oxide.

4. Method according to claim 1, wherein, once the electrolyte has been formed, a second protective thin layer is deposited on the whole of the substrate comprising the current collectors, the cathode and the electrolyte.

5. Method according to claim 4, wherein the second protective thin layer consists of the same material as the first protective thin layer.

6. Method according to claim 1, wherein formation of the anode comprises at least the following steps:
   deposition of an anodic thin layer on the substrate provided with the current collectors, the cathode and the electrolyte,
   deposition of a third protective thin layer and then of a second masking thin layer on the anodic thin layer,
   fabrication of a mask by photolithography on the second masking thin layer,
   selective etching of the second masking thin layer then removal of the mask,
   selective etching of the third protective thin layer and of the anodic thin layer so as to form the anode in the anodic thin layer and removal of the third protective thin layer and the second masking thin layer.

7. Method according to claim 6, wherein the third protective thin layer consists of the same material as the first protective thin layer whereas the second masking thin layer consists of the same material as the first masking thin layer.

8. Method according to claim 1, consisting, once the anode has been formed, in depositing a fourth protective layer on the stack formed by the current collectors, the cathode, the electrolyte and the anode.

9. Method according to claim 8, wherein the fourth protective thin layer consists of the same material as the first protective thin layer.

10. Method according to claim 1, consisting, once the anode has been formed, in depositing, on the stack formed by the current collectors, the cathode, the electrolyte and the anode, a protective envelope covering the whole of the stack to protect the latter against any external contamination.

11. Method according to claim 10, wherein the protective envelope comprising at least first and second distinct superposed encapsulation layers and wherein the first encapsulation layer comprises at least one material that is chemically inert with regard to lithium, selected from the group consisting of a hydrogenated amorphous silicon carbide, a hydrogenated amorphous silicon oxycarbide, hydrogenated amorphous carbon, fluorinated amorphous carbon and hydrogenated amorphous silicon whereas the second encapsulation layer comprises a material selected from the group consisting of a hydrogenated amorphous silicon carbonitride, a hydrogenated amorphous silicon nitride and fluorinated amorphous carbon, the first and second encapsulation layers being successively deposited on the whole of the anode by plasma enhanced chemical vapor deposition at a deposition temperature less than or equal to 150° C.

12. Method according to claim 11, consisting, before deposition of the second encapsulation layer, in depositing an intermediate layer comprising a material selected from the group consisting of a phosphorus-doped silicon oxide, hydrogenated amorphous carbon and fluorinated amorphous carbon by plasma enhanced chemical vapor deposition at a deposition temperature less than or equal to 150° C.

* * * * *